United States Patent [19]

Langsam et al.

[11] Patent Number: 4,859,215

[45] Date of Patent: Aug. 22, 1989

[54] POLYMERIC MEMBRANE FOR GAS SEPARATION

[75] Inventors: Michael Langsam, Allentown; Pushpinder S. Puri, Macungie; Madhu Anand, Allentown; Daniel V. Laciak, Fogelsville, all of Pa.

[73] Assignee: Air Products and Chemicals, Inc., Allentown, Pa.

[21] Appl. No.: 144,295

[22] Filed: May 2, 1988

[51] Int. Cl.$^4$ ............................................. B01D 53/22
[52] U.S. Cl. .......................................... 55/16; 55/68; 55/158
[58] Field of Search .............................. 55/16, 68, 158

[56] References Cited

U.S. PATENT DOCUMENTS

| 4,430,807 | 2/1984 | Davis et al. ........................ 55/16 X |
| 4,472,175 | 9/1984 | Malon et al. ............................ 55/16 |
| 4,607,088 | 8/1986 | Nomura et al. |
| 4,654,055 | 3/1987 | Malon et al. ........................ 55/16 X |
| 4,657,564 | 4/1987 | Langsam ................................ 55/16 |
| 4,714,481 | 12/1987 | Matsuura et al. ................... 55/16 X |
| 4,728,346 | 3/1988 | Murphy ............................... 55/16 X |
| 4,746,334 | 5/1988 | Matsui et al. ....................... 55/16 X |
| 4,755,192 | 7/1988 | Koros et al. ........................... 55/16 |
| 4,755,193 | 7/1988 | Higashimura et al. ................ 55/16 |

FOREIGN PATENT DOCUMENTS

| 168133 | 1/1986 | European Pat. Off. .............. 55/158 |
| 12104 | 1/1985 | Japan .................................... 55/158 |
| 78601 | 5/1985 | Japan .................................... 55/158 |
| 132605 | 7/1985 | Japan .................................... 55/158 |
| 212414 | 10/1985 | Japan .................................... 55/158 |
| 222111 | 10/1985 | Japan .................................... 55/158 |
| 238352 | 11/1985 | Japan .................................... 55/158 |
| 15718 | 1/1986 | Japan .................................... 55/158 |
| 18421 | 1/1986 | Japan .................................... 55/158 |
| 35803 | 2/1986 | Japan .................................... 55/158 |
| 35823 | 2/1986 | Japan .................................... 55/158 |
| 71820 | 4/1986 | Japan .................................... 55/158 |
| 146321 | 7/1986 | Japan .................................... 55/158 |
| 33524 | 2/1987 | Japan .................................... 55/158 |
| 33526 | 2/1987 | Japan .................................... 55/158 |
| 42724 | 2/1987 | Japan .................................... 55/158 |
| 62-133526 | 2/1987 | Japan . |
| 79831 | 4/1987 | Japan .................................... 55/158 |
| 136225 | 6/1987 | Japan .................................... 55/158 |
| 1221404 | 2/1971 | United Kingdom .................. 55/158 |

OTHER PUBLICATIONS

T. Masuda and T. Higashimura, Adv. Polym. Sci., 81, 121 (1987).
Isobe et al., J. Polym. Sci.: Part A: Polym. Chem., 24, 1839 (1986).
Felder and Huvard (Methods of Experimental Physics, 16C 315 (1980).
Stannett (in "Diffusion in Polymer", ed. by J. Crank and G. S. Park, pp. 62-64, Academic Press, New York, 1968).
Brown and Sauber (in Modern Plastics, Aug. 1959).
Brubaker and Kammermeyer (Ind. Eng. Chem., 45, 1148 (1953)).
L. M. Robeson, Polym. Eng. Sci., 9, 277 (1969).
Maeda and Paul (J. Mem. Sc., 30, 1 (1987).
Nakanishi, et al, (Polym. J., 19, 293 (1987).
Masuda, et al. (J. Appl. Polym. Sci., 30, 1605 (1985).
Masuda, et al. (Adv. Polym. Sci., 81, 121 (1987).
Nakagawa (Japanese High Technology Monitor, 4(11), Jun. 5, 1986).
Witchey, et al, "Sorption and Transport of Organic Vapors in Poly(1-trimethyslsilyl-1-propyne", AICHE Annual Meeting, New York City, Nov. 16, 1987.
Masuda et al, Macromolecules, 18, 841 (1985).

*Primary Examiner*—Robert Spitzer
*Attorney, Agent, or Firm*—Mark L. Rodgers; William F. Marsh; James C. Simmons

[57] ABSTRACT

The present invention is a modified polymeric membrane having improved selectivity for separating gas mixtures. The membrane comprises a silyl substituted polyacetylene polymer to which has been added 5 to 50 wt. % of an additive which is miscible with the polymer, has a boiling point >300° C. at atmospheric pressure, is soluble in a common solvent for the polymer and increases the selectivity ratio of $O_2/N_2$ by at least 15% over the polymer without the additive.

19 Claims, No Drawings

POLYMERIC MEMBRANE FOR GAS SEPARATION

TECHNICAL FIELD

The present invention relates to modified polymeric membranes which are utilized to separate specific components of a gas mixture.

BACKGROUND OF THE INVENTION

Silyl-containing substituted polyacetylenes have been noted to exhibit the highest gas permeability of any known polymeric materials (T. Masuda and T. Higashimura, Adv. Polym. Sci., 81, 121 (1987)). Poly(trimethylsilylpropyne), for example, has been shown to exhibit an $O_2$ permeability of about 10 times that of silicone rubber. Prior to the appearance of poly(trimethylsilylpropyne) permeability data, silicone rubber was noted to be the most permeable polymeric material known. While the silyl-containing substituted polyacetylenes exhibit very high gas permeability, their selectivity (e.g., $O_2/N_2$) for gas separation is quite low. Generally, for applications involving enhanced oxygen (e.g., for enhanced combustion applications) separation factors of 2.0 or greater are desired. Poly(trimethylsilylpropyne) has been reported to have an $O_2/N_2$ separation factor of 1.8 (Isobe et al., J. Polym. Sci.: Part A: Polym. Chem., 24, 1839 (1986)). Attempted duplication of this by the Applicants. however, indicated that the $O_2/N_2$ separation factor for ths polymer was in a range of about 1.4 to 1.5. One possible route to solving this problem would be to prepare silyl-containing substituted polyacetylenes of different structure. Several examples of this exist, such as poly(1-dimethyl-nhexylsilyl)-1-propyne) and poly(4,4,6.6-tetramethyl-4,6-disila-2-heptyne) which have higher separation factors for $O_2/N_2$ than poly(trimethylsilylpropyne) and also lower $O_2$ permeabilities (see Isobe et al., above).

While this is a possible approach, another facile method may be to add a material to poly(trimethylsilylpropyne) which yields the same end result (e.g., increasing the separation factor while maintaining reasonably high permeabilities). It has been found that the addition of certain classes of low molecular weight liquids which exhibit miscibility with poly(trimethylsilylpropyne) and have very low volatility yield improved separation factors to $O_2/N_2$ separation.

In many cases, the addition of low molecular weight liquids to polymeric materials results in a lowering of the modulus (increased flexibility) and increased permeability of gases as the molecular chains exhibit more mobility. There are a number of examples which include the following: Felder and Huvard (Methods of Experimental Physics. 16C, 315(1980)) note "the introduction of a plasticizer into a polymer either during fabrication or subsequently by permeation increases the mobility of chain segments and consequently increases the effective diffusion coefficient, primarily by lowering the activation energy of diffusion." Stannett (in "Diffusion in Polymer", ed. by J. Crank and G. S. Park, p. 62–64, Academic Press, New York, 1968) noted "the addition of a plasticizer polymer decreases the cohesive forces between the chains resulting in an increase in segmental mobility. It is clear that this should result in an increased rate of diffusion and a lower activation energy." Brubaker and Kammermeyer in an early study (Ind. Eng. Chem., 45. 1148(1953)) noted increases in gas permeation with plasticizer additon to poly(chlorotrifluoroethylene) and cellulose acetate. Brown and Sauber (in Modern Plastics, August 1959) noted that plasticized poly(vinlychloride) exhibits much higher $O_2$, $N_2$, and $CO_2$ permeabilities than rigid (unplasticized) poly(vinylchloride). While most of the data in the literature suggests that low molecular weight liquids will result in reduced modulus and increased permeability. there are examples whereby the addition of low molecular weight liquids (primarily those with rigid units such as aromatic groups) to glassy polymers having large secondary loss transitions lead to a reduction in permeability and an increase in modulus (see L. M. Robeson, Polym. Eng. Sci., 9, 277 (1969)). Polymers which exhibit large secondary loss transitions include polycarbonates, polysulfones, polyhydroxyethers, poly(aryletherketones), aromatic polyesters (e.g., PET), and polyarylates. Poly(trimethylsilylpropyne) and other silyl substituted polyacetylenes we have investigated show no significant secondary loss transitions, and thus would not be expected to be capable of antiplasticization. More recently, work reported by Maeda and Paul (J. Mem. Sc., 30, 1(1987)) noted antiplasticized polymers yielded increasing separation factors for several gas pairs (e.g., $He/CH_4$, $He/N_2$, $H_2/CH_4$). Poly(trimethylsilyl- propyne), however, has been found to exhibit behavior different than either plasticzed or antiplasticized polymers. As an example, silicone oil addition to PTMSP leads to no change in mechanical properties, but decreased permeability. This behavior appears to be unique for poly(trimethylsilylpropyne) and other silyl substituted polyacetylenes. The separation factor for $O_2/N_2$ increases with addition of silicone oil (as well as other miscible liquids) and is the essence of this invention.

Poly(trimethylsilylpropyne) has been noted to exhibit a decreasing permeability with time. Nakanishi. et al., noted (Polym. J., 19, 293 (1987)) that the gas permeability of PTMSP decreased with time under vacuum. Asakawara, et al. (Japanese Patent Disclosure No. 61-35823, Feb. 20. 1986) noted an initial $\bar{P}(O_2)$ of 7000 barrers for PTMSP when cast from toluene. Casting from benzene and spread on a water surface or heat treatment at 50° C. yielded a remarkable change in permeability (decreasing to 200 barrers). Asakawara, et al., found a lower alcohol treatment of the heat aged film or benzene cast film returned the permeability values back to the original "intrinsic" value. Masuda, et al. (J. Appl. Polym. Sci., 30, 1605 (1985)) reported the $\bar{P}(O_2)$ value for PTMSP decreased to 1/10th of the original value when heated at 100° C. for 15 hours. Masuda, et al. (Adv. Polym. Sci., 81, 121 (1987)) reported the "$\bar{P}(O_2)$ value of PTMSP gradually decreases to about 1% of its original value when the membrane is left at room temperature for several months." They suggested that the "membrane of PTMSP has many molecular-scale holes just after its preparation, while relaxation of the structure occurs with time to make the holes smaller and fewer." This problem of aging which has been well-documented in the open literature raises serious questions about the utility of PTMSP and thus other silyl substituted polyacetylenes for gas (in particular $O_2/N_2$) separation applications. Nakagawa (Japanese High Technology Monitor, 4(11), June 5, 1986) reported that PTMSP has initial high gas permeability which decreases rapidly with time. Nakagawa noted that addition of 3–5% dioctyl phthalate followed by heat treatment of the membrane yields a stable gas permeability with an $O_2/N_2$ separation factor of about 3. In the studies reported herein, we have not been able to duplicate the results of the above aging problem except in a case of films exposed to vacuum for extended periods. Normal casting and permeability testing conditions in our experiments demonstrate a remarkable $\bar{P}(O_2)$ stability versus time for PTMSP even approaching a year duration. We have also found that it is not necessary to heat treat membranes to obtain stable films or is it necessary to add additives followed by heat treatment to achieve stable $\bar{P}(O_2)$ values. In fact, we have found prior to the above-stated references that PTMSP exhibits stable $\bar{P}(O_2)$ values and addition of liquids (e.g., oils such as Nujol oil and silicone oil) lead to reduced $O_2$ permeability and increased $O_2/N_2$ separation factors which are stable without further heat treatment. We have also found that heat treatment (without vacuum) for extended periods does not lead to the dramatic reductions in permeability reported in the literature. The conclusion reached in consideration of all this data is that the results reported in the literature are based on the exposure of PTMSP films to vacuum resulting in "aerosol" vacuum oil being sorbed by the PTMSP films resulting in lowered $O_2$ permeability thus analogous to the experiments where silicone oil or Nujol oil have been purposely added. It is much preferred to add the oil or liquid initially to the film instead of exposure to vacuum to yield the end result. Our conclusions on vacuum oil sorption were recently confirmed by Witchey, et al. (paper titled "Sorption and Transport of Organic Vapors in Poly(1-trimethylsilyl-1-propyne", presented at the Annual Mtg. of the AICHE, New York City, Nov. 16. 1987) where it was noted that PTMSP exposed to $10^{-3}$ to $10^{-4}$ Torr vacuum increased in weight and yellowed after extended periods of exposure and, upon removal, exuded the pump oil odor. This result previously verified with $\bar{P}(O_2)$ experiments in our own laboratories is thus unexpected and removes the serious questions noted in the literature concerning the applicability of PTMSP and other silyl substituted polyacetylenes for gas separation applications. In fact. direct addition of certain liquids and oils (including mechanical pump oils) leads to an improved separation capability and does not require heat treatment for stability. This observation, combined with the unique properties of PTMSP which are unlike typical plasticized or antiplasticized polymers with miscible oil or liquid addition, is unexpected and is the essence of the invention clamed herein.

Other modifications of silyl-containing substituted polyacetylenes to yield improved separation factors for $O_2/N_2$ as well as other gas pairs of interest include surface fluorination (M. Langsam, U.S. Pat. No. 4.657,564, Apr. 14, 1987), plasma treatment (Nomura, et al., U.S. Pat. No. 4,607,088, Aug 19, 1986). and addition of Fe phthalocyanine tetracarboxylic acid (Asakawara, et al., Jpn. Kokai Tokyo Koho JP 62133526 A2 (87/33526), Feb. 13, 1987).

The utility of the additive modified silyl substituted polyacetylenes lies primarily in the use as a permeable membrane for gas separation in general with particular interest in $O_2/N_2$ separation. This utility is of particular interest for oxygen enriched air applications which are important in energy savings in combustion use (including oxygen enrichment for industrial combustion processes, domestic heating use, as well as for internal combustion engine efficiency improvement for transportation), enriched oxygen for medical use, enriched oxygen for sludge treatment, enriched oxygen for hybrid air separation processes to improve efficiency of cryogenic or adsorption processes.

Membrane separation by dfferential gas permeabilities is an emerging technology which has reached commercial status in the past decade and continues to grow in importance. For enhanced oxygen applications, silicone rubber has been considered to be the primary membrane of choice. Silicone rubber has a very low modulus (thus poor load or pressure bearing capabilities), must be crosslinked for utility, and is difficult to prepare in ultra-thin membranes. Silyl substituted polyacetylenes offer much higher modulus (>100 times that of silicone rubber), do not need crosslinking, and can be prepared in ultra-thin membranes easily. Certain membranes of the silyl substituted polyacetylene family (e.g. poly(trimethylsilylpropyne) offer much higher permeability than silicone rubber.

BRIEF SUMMARY OF THE INVENTION

The present invention comprises a modified polymeric membrane having improved selectivity for separating gas mixtures. The membrane comprises a silyl substituted polyacetylene polymer having the general structural formula:

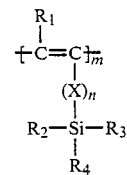

where $R_1$ is a linear or branched $C_1$-$C_4$ alkyl group; $R_2$ and $R_3$ are independently linear or branched $C_1$-$C_6$ alkyl groups; $R_4$ is a linear or branched $C_1$-$C_{12}$ alkyl group or aryl group; X is a $C_1$-$C_3$ alkyl group or phenyl; m is at least 100 and n is 0 or 1, to which has been added 5 to 50 wt.% (based upon unmodified polymer) of an additive which is miscible with the above polmer, has a boiling point $>300°$ C. at atmospheric pressure, is soluble in a common solvent for the polymer and increases the selectivity ratio of $O_2/N_2$ by at least 25% over the polymer without said additive.

The additives include silicone oil, hydrocarbon oils, liquid surfactants. poly(vinyl chloride) plasticizers and stabilizers, epoxidized compounds, natural oils, flame retardant additives, and nitrogen or sulfur containing aromatic compounds. The addition of these additives to the silyl substituted polyacetylenes yields improved selectivity for gas separation and is thus of interest for membrane separation applications.

The properties of the additive modified silyl substituted polyacetylene are different from either plasticized or antiplasticized polymers previously noted in the literature and thus are unique compositions with unexpected property profiles.

DESCRIPTION OF THE INVENTION

The present invention comprises a modified polymeric membrane having improved selectivity for use in separating gas mixtures. The membrane comprises a silyl substituted polyacetylene having the general structural formula:

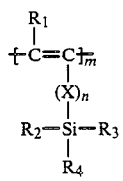

where $R_1$ is a linear or branched $C_1$-$C_4$ alkyl group; $R_2$ and $R_3$ are independently linear or branched $C_1$-$C_6$ alkyl groups; $R_4$ is a linear or branched $C_1$-$C_{12}$ alkyl group or aryl group; X is a $C_1$-$C_3$ alkyl group or phenyl; m is at least 100 and n is 0 or 1.

It is expected that germanium can be substituted for silicone in the above formulas and would also be useful in the present invention since a close correlation has been shown between the gas separation properties of silyl and germyl substituted acetylenes in U.S. Pat. No. 4,759,776.

The basic polymer can be produced by any conventional polymerization methods capable of synthesizing the above-noted polymers to molecular weights capable of film forming properties. Typical polymerization procedures involve polymerizing monomer units in an organic solvent using a suitable catalyst such as $TaCl_5$, $MoCl_5$, $NbCl_5$ and the like, with or without metal hydrides/metal alkyles such as triphenyl bismuth, tetraphenyl tin, triethyl aluminum, etc. While the polymer can have a wide range of molecular weights wherein m is at least 100, for overall property characterstics (e.g. mechanical and solution viscosity), it is desired to have a value of m>200 and less than 50,000. The polymerization details of silyl substituted polyacetylenes have been covered in various publications; for example, Masuda et al, Macromolecules. 18, 841(1985); Isobe et al., J. Polym. Sci., Part A, Polym. Chem., 24, 1839 (1986); Masuda et al. Adv/Polym. Sci., 81, 121 (1987).

The additives to be considered will generally be liquid, however, under certain conditions solids will be acceptable if they meet the same basic requirements as outlined below. The basic requirements for the additives for this invention include:

(i) The additive should be miscible with the silyl substituted polyacetylene. Partial miscibility would be of interest only if the miscible constituents retain the property characteristics described in the other requirements.

(ii) The additive should have a very low vapor pressure at use temperature. In order to exhibit the low vapor pressure. it is expected that the additives have an atmospheric pressure boiling point of >300° C. The requirement of low vapor pressure is necessary so that devolatilization from the film with time will result in changing permeability and selectivity.

(iii) The additive should be at least as stable in the use environment as the silyl substituted polyacetylene. This is particularly important in applications involving air separation.

(iv) The additive should not promote the premature degradation of the silyl substituted polyacetylene.

(v) The additive should not plasticize the silyl substituted polyacetylene polymer excessively such that unacceptably low strength and stiffness result.

(vi) The additive should not migrate or have constituents which migrate to the surface such that oily surface characteristics result trapping dust, debris, etc. (e.g. "blooming" effects).

(vii) The additive should not affect the ability to form films. asymmetric membranes or hollow fibers.

(viii) The additive must be soluble in a common solvent for the silyl substituted polyacetylene which can be utilized for membrane casting.

The different types of additives which should meet the above requirements are listed below:

(i) Silicone oil and other pertinent silicone based fluids.

(ii) Low volatility hydrocarbon oils (e.g. naphthenic, aromatic, aliphatic, and cycloaliphatic). The hydrocarbon oils which are useful as oil extenders commonly utilized in rubber formulations. These compounds are commonly referred to as petroleum process oils. If the oil has 50% or more of the carbon chains present as paraffin side chains, it is referred to as an aliphatic (or paraffinic) oil. An oil is classified as a naphthenic oil if it contains fewer carbons in the aliphatic side chains and more carbon atoms in the naphthenic or aromatic rings. Aromatic oils contain >35% of the carbon atoms in the aromatic rings.

(iii) Non-ionic surfactants, (e.g., Triton X (ethoxylated nonyl phenol)), wherein an alkyl aryl moiety is condensed with ethylene oxide in molar ratios of 5–50.

(iv) Plasticzers typically utilized in poly(vinyl chloride) plasticized applications. These would include the lower volatilty members of the followings list: dioctyl sebacate, dioctyl phthalate, butyl laurate, dibutyl sebacate, diisooctyl adipate, bityl oleate, trioctyl phthalate, butyl acetyl ricinoleate, tetraethylene glycol di-2-ethylhexoate, tributoxy-dethyl phosphate, trioctyl phosphate, diisodecyl phthalate, ditridecyl phthalate, dipropylene glycol dibenzoate, diethylene glycol dibenzoate, bis(2-ethyhexyl) hexa hydrophthalate, bis(2-ethyl hexyl) isophthalate and the like.

(v) Dyestuff commonly utilized to impart color to various polymers (e.g. fibers) which could include compounds such as quinacridone. thiondigo, dioxazine, naphthol red, antraquinone, perylene, monoazo red, diarylide yellow xylidide, anthrapyrimidine, phthalocyanine, and the like.

(vi) Certain flame retardant additives including triphenyl phosphate, tricresyl phosphate, decabromodiphenyl oxide, pentabromoethylbenzene, bis(tribromophenoxy) ethane, bis(tetrabromophthalimido) ethane, bis(pentabromophenoxy) ethane, tris(1,3-dichloropropyl) phosphate, diethyl bis(2-hydroxyethyl) aminomethylphosphate, octyl diphenyl phosphate and the like.

(vii) Certain liquid or resinous epoxy compounds or epoxy intermediates, such as the diglydcidol ether of Bisphenol A, epoxidized soybean oil, epoxidized linseed oil. 3,4-epoxycyclohexylmethyl-3,3-epoxy cyclohexane carboxylate, 2-(3,4- epoxycyclohexyl-5, 5-spiro3,4-epoxy) cyclohexane meta dioxane, bis(3,4-epoxycyclohexyl) adipate, acetyl epoxy stearate, acetyl epoxy tallate and the like.

(viii) Low molecular weight liquids used to stabilize PVC including barium-cadmium liquids, barium-cadimum-zinc liquids, octyl tin and methyl tin liquids, barium-zinc liquids, butyl tin mercaptides and the like.

(ix) High temperature heat transfer fluids such as partially hydrogenated terphenyls or low molecular poly(phenylene oxides).

(x) Additional liquids such as diethylene glycol dibenzoate. linseed oil, soybean oil, tung oil, mineral oil, palm oil, castor oil, unsaturated vegetable oils and the like. Certain of these compounds will have poor fungus resistance and addition of fungcidal agents will be required.

(xi) Resinous plasticizers such as coumarone-indene resins. xyleneformaldehyde resins, and various compounds commonly referred as resins would also be of interest in the present invention.

(xii) Compounds containing nitrogen or sulfur bonded to aromatic groups or nitrogen as a part of the aromatic structure. Examples of these compounds include 4,4'bipyridine. phenazene. 10-methyl phenothiazene, 1-acridine, dibenzothiaphene, Bis(N,N dimethyl aniine) methane, and the like.

The above list of materials are examples of additive systems which will meet the basic requirements for selectivity modifying additives for silyl substituted polyacetylenes. This list is not intended to be restricted to those compounds or classes of compounds noted in the list and other liquids and solids offering the basic requirements as selectivity modifiers can also be used.

The additive-modified silyl substituted polyacetylenes of this invention can be utilized in various forms for gas separation applications including flat sheet, spiral wound or hollow fiber membrane systems. They can be cast into thin films and applied to porous substrates (e.g. polysulfone, polyacrylonitrile, polypropylene, cellulosic porous supports) in either flat sheet or hollow fiber form. They could also be cast into a porous substrate and coagulated in a nonsolvent (for both the silyl substituted polyacetylene and the appropriate modifying additive). Additionally, they could be coagulated in a hollow fiber form. The coagulation process can be designed to yield an asymmetric membrane or hollow fiber having a dense skin with a porous substrate. The resultant membranes or hollow fibers can be assembled into a module for gas separation via conventional techniques. Antioxidants or other stabilizers can be added to the additive modified silyl substituted polyacetylenes to improve long-term stability particularly in applications involving $O_2/N_2$ separations.

Preferably, the additive will be incorporated into the silyl substituted polyacetylene prior to the preparation of the thin film membrane, asymmetric membrane, or hollow fiber membrane. This incorporation is made via addition of the additive and the silyl substituted polyacetylene to a common solvent. Alternatively, the additive can be incorporated by exposure of the film to a solution of a swelling non-solvent for the polymer containing the additive; e.g., a lower alcohol; to which the film is exposed followed by the volatlization of the swelling non-solvent.

While the preferred gas separation for the additive modified silyl substituted polyacetylenes is $O_2/N_2$, other separations can be considered including but not restricted to $CO_2/CH_4$; $CO_2/N_2$; $He/CH_4$; $H_2/CH_4$; $H_2/N_2$; and $He/N_2$.

Experimental

Synthesis of Poly(Trimethylsilylpropyne) (PTMSP)

100 grams of Toluene was mixed with $TaCl_5$ catalyst and stirred for about 5 minutes until it dissolved to form a bright yellow solution. About 25 grams of trimethyl silyl propyne (TMSP) monomer was added and the solution immediately turned dark brown. Within two hours there was a noticeable increase in solution vicosity. After 24 hours the reaction mixture was quenched in methanol, washed with about 1000 ml of methanol and then dried, leaving a PTMSP Polymer.

The polymer produced, polytimethyl silyl propyne. (PTMSP), has the structure:

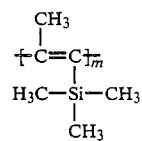

Wherein m is at least 100.

By varying the monomer (TMPS) to catalyst ($TaCl_5$) ratio, it was possible to control the molecular weight of the polymer. The yields and Brookfield viscosities of 1.7% toluene solutions of several of the polymers synthesized according to the above procedure are listed in Table 1 below:

TABLE 1

| PHYSICAL PROPERTIES OF PTMSP | | | | |
|---|---|---|---|---|
| | RUN NUMBER | | | |
| | 1 | 2 | 3 | 4 |
| M/C[1] | 25/1 | 100/1 | 100/1 | 200/1 |
| Yield (%) | 100% | 100% | 100% | 87% |
| Brookfield Viscosity[2] | 164 | 248 | 250 | 346 |

[1]M = Monomer; TMSP MW = 112.19
C = Catalyst; $TaCl_5$ MW = 357
M/C = Mole ratio of monomer to catalyst
[2]Brookfield viscosity in toluene @ 1.7% TS in centipoise The samples of poly(trimethylsilylpropyne) described above along with samples containing additites were dissolved in a suitable solvent at 2 to 4 weight % solids and cast into a thin membrane on a glass casting surface. The polymer films cast were in the range of 30-100 microns thickness (after evaporation ot solvent). Solvent evaporation was conducted by air drying. The polymer films were removed from the glass casting surface by soaking in water. The films were mounted in a CSC-135 Permeation Cell (manufactured by Custom Scientific Corporation, Whippany, N.J.) using a procedure similar to that described in an article by S. A. Stern, et al. in Modern Plastics, October 1964.

EXAMPLE 1

A sample Of PTMSP was cast into a thin film from toluene in accordance with the procedures recited above, and was tested for permeability. The intrinsic viscosity of the PTMSP was 4.65 dl/gr as measured in oluene at 30° C. The permeability for various gases and selectivity for gas mixtures were measured and the results are given in Table 2.

EXAMPLE 2

1 wt. % Nujol oil which is a heavy mineral oil U.S.P., obtained by Swan (see Merck Index 9th ed. citation 6971), was added to a sample of PTMSP as described in Example 1, and the mixture was cast into a thin film from toluene and tested for permability. The permability and selectivity results are given in Table 2.

EXAMPLE 3

A sample of PTMSP containing 10 wt. % Nujol oil was cast into a thin film from toluene as described above and was tested for permeability and selectivity. The results are given in Table 2.

EXAMPLE 4

2 wt. % PS-045 silicone oil (Mw=65,000) was added to a sample of PTMSP and the mixture was cast into a thin film from toluene and tested for permeability and selectivity. The results are given in Table 2.

EXAMPLE 5

A sample of PTMSP containing 10 wt. % PS-045 silicone oil (Mw=65,000) was cast into a thin film from toluene and tested for permeability and selectivity. The results are given in Table 2.

EXAMPLE 6

10 wt. % Triton 100X obtained from Rohm & Haas, Inc. (ethylene oxide based surfactant) was added to a sample of PTMSP snd the mixture was cast into a thin film from toluene and tested for permeability and selectivity. The results are given in Table 2.

EXAMPLE 7

10 wt. % Igepal 650 (ethylene oxide based surfactant) was added to a sample of PTMSP and the mixture was cast into a thin film from toluene and tested for permeability and selectivity. The results are given in Table 2.

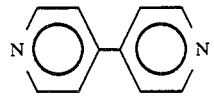

TABLE 3

Effect of 4,4' Bipyridyl (B.P.) on $\bar{P}(O_2)$ and $\alpha(O_2/N_2)$
Example 8

| Level of 4,4' BP (%) | $\bar{P}(O_2)$ | $\bar{P}(N_2)$ | $\alpha(O_2/N_2)$ |
|---|---|---|---|
| 0 | 9500 | 6800 | 1.40 |
| 12.5 | 1758 | 978 | 1.78 |
| 25 | 317 | 132 | 2.40 |
| 37.5 | 119 | 47 | 2.53 |
| 50[1] | 63 | 30 | 2.10 |

[1]heterogeneous

As can be seen from the results reported in Table 8 above, the permeabilities for both $O_2$ and $N_2$ decreased as additive concentration increased. Selectivity for $O_2/N_2$ increased with increasing additive concentration until a large concentration of additive was present at which point the selectivity began to decrease. At about 50 wt. % additive, the selectivity was decreasing and the permeability was approaching a point where the utility of the membrane was greatly diminished.

EXAMPLE 9

25 wt. % phenazene, a compound containing two nitrogen atoms bonded to aromatic structures, was

TABLE 2

| Example # | 1 | 2 | 3 | 4 | 5 | 6 | 7 |
|---|---|---|---|---|---|---|---|
| Additive to PTMSP | None (Control) | 1% Nujol oil | 10% Nujol oil | 2% PS-045 silicone oil | 10% PS-045 silicone oil | 10% Triton 100X | 10% Igepol 650 |
| $\bar{P}$ (barriers) | | | | | | | |
| He | 6,076 | 5,533 | 996 | 5,573 | 2.071 | — | — |
| $O_2$ | 9,490 | 8,186 | 1,183 | 8,492 | 2,649 | 240 | 740 |
| $N_2$ | 6,467 | 5,400 | 540 | 5,767 | 1,486 | 90 | 330 |
| $CO_2$ | 32,909 | 28,494 | 5,290 | 30,227 | 12,257 | — | — |
| $\alpha$ (selectivity) | | | | | | | |
| $O_2/N_2$ | 1.47 | 1.52 | 2.19 | 1.47 | 1.73 | 2.7 | 2.3 |
| $He/N_2$ | 0.94 | 1.03 | 1.84 | 0.97 | 1.39 | — | — |
| $CO_2/N_2$ | 5.09 | 5.28 | 9.80 | 5.24 | 8.25 | — | — |

From the results reported in Table 2 above, it can be seen that all four additives increased the selectivity for various gas mixtures, compared to the PTMSP membrane without additives. Additionally, for the case of both Nujol oil and silicone oil, the selectivity increased significantly with an increase in additive concentration from 1%-10%.

EXAMPLE 8

Samples of PTMSF containing 0, 12.5, 25, 37.5, and 50 wt. % 4,4' bipyridine respectively were cast into thin films from toluene. The results are listed in Table 3 for $O_2$ and $N_2$ permeability, along with $O_2/N_2$ separation factors. The sample containing 50 wt. %4,4' bipyridine was hetergeneous as judged by sample appearance and transparency. The other samples were transparent and thus judged to be miscible. The structural formula for 4,4' bipyridine is:

added to a sample of PTMSP and the mixture was cast into a thin film from toluene and tested for $O_2$ and $N_2$ permeability and selectivity. The results are listed in Table 4.

EXAMPLE 10

25 wt. % 10-methyl phenothiazene, a compound containing a nitrogen atom bonded to an aromatic structure, was added to a sample of PTMSP and the mixture was cast into a thin film from toluene and tested for $O_2$ and $N_2$ for permeability and selectivity. The results are listed in Table 4.

EXAMPLE 11

25 wt. % acridene, a compound having nitrogen as part of an aromatic structure, was added to a sample of PTMSP and the mixture was cast into a thin film from toluene and tested for $O_2$ and $N_2$ permeability and selectivity. The results are listed in Table 4.

EXAMPLE 12

25 wt. % dibenzothiaphene, a compound having sulfur bonded to an aromatic structure, was added to a sample of PTMSP and the mixture was cast into a thin film from toluene and tested for $O_2$ and $N_2$ permeability and selectivity. The results are listed in Table 4.

Table 5 below do not show the aging characteristics widely quoted in the literature; i.e. dramatic loss of permeability over relatively short periods of time.

TABLE 5

| Conditions | Control | Control | 85° C./5 h | 100° C./24 h | 150° C./1 h | 150° C./2½ hr |
|---|---|---|---|---|---|---|
| P* (barrers) | | | | | | |
| He | 5,435 | 5,660 | 5,179 | 5,755 | 5,440 | 5,882 |
| $O_2$ | 8,242 | 8,813 | 7,824 | 8,485 | 9,250 | 9,119 |
| $N_2$ | 5,621 | 6,427 | 5,291 | 6,021 | 6,383 | 6,953 |
| $CO_2$ | 29,700 | 31,244 | 28,433 | 31,039 | 33,185 | 33,975 |
| α(selectivity) | | | | | | |
| $O_2/N_2$ | 1.47 | 1.37 | 1.48 | 1.41 | 1.45 | 1.31 |
| $CO_2$/He | 5.46 | 5.52 | 5.49 | 5.39 | 5.78 | 5.78 |

*P = scc/sec 1/cm² cm 1/cm (Hg) × $10^{+10}$ (barrers)

TABLE 4

Effect of Additives at 25 wt. % in PTMSP on $\bar{P}(O_2)$ and $\alpha(O_2/N_2)$

| Example | Additive (25 wt. %) | $\bar{P}(O_2)$ | $\bar{P}(N_2)$ | $\alpha(O_2/N_2)$ |
|---|---|---|---|---|
| 9 | Phenazene | 167 | 66 | 2.53 |
| 10 | 10-Methyl phenothiazone | 192 | 82 | 2.34 |
| 11 | Acridine | 116 | 43 | 2.73 |
| 12 | di benzothiaphene | 438 | 184 | 2.38 |

The structures for the additives in Examples 9–12 are shown below:

Phenazene

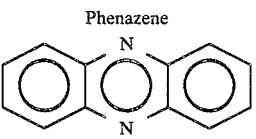

10-methyl phenothiazone

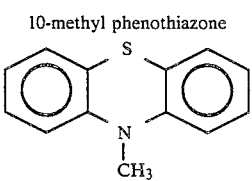

1-acridine

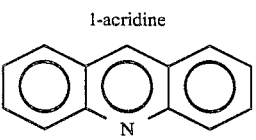

Dibenzothiaphene

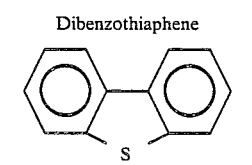

Other materials, such as tolueidine blue and azure blue were considered but, because of their ionic structure, did not dissolve in toluene and thus were not considered effective additives as they would also be expected to yield hetergeneous solutions with PTMSP.

EXAMPLE 13

Samples of poly(trimethylsilypropyne) were cast from toluene into thin films and tested for permeability for a variety of gases after various aging conditions. The results are listed in Table 5. The results reported in

EXAMPLE 14

Samples of poly(trimethylsilypropyne) were cast from toluene into thin films and tested for permeability (both within several days after casting and 20 months after casting and storage under laboratory conditions). The results shown in Table 6 do not show the aging characteristics widely quoted in the literature.

TABLE 6

Permeability ($\bar{P}$) and selectivity (α) as a Function of Time for PTMSP

| $\bar{P}$(barrers) | Initial | After 20 Months Laboratory Storage |
|---|---|---|
| He | 4,895 | 5,152 |
| $O_2$ | 7,449 | 7,409 |
| $N_2$ | 5,701 | 5,233 |
| $CH_4$ | 12,813 | 13,440 |
| α | | |
| $O_2/N_2$ | 1.31 | 1.42 |
| He/$CH_4$ | .382 | .383 |

The results reported in both Tables 5 and 6 above show that PTMSP film membranes are stable over time and do not exhibit significant losses in permeability and selectivity, even after 20 months storage.

EXAMPLE 15

A sample of PTMSP (as described in Example 1) containing 25% epoxidized soybean oil (Drapex 68) was cast from toluene and tested for permeability and selectivity. The $\bar{P}(O_2)$ value was 36.0 barrers and the separation factor for $O_2/N_2$ was 3.39

EXAMPLE 16

A sample of PTMSP (as described in Example 1) containing 25% octyl tin mercapticle, PVC stabilizer (Sanclear 7-4654) was cast from toluene and tested for permeability and selectivity. The $\bar{P}(O_2)$ value was 44.1 barrers and the separation factor for $O_2/N_2$ was 3.44.

EXAMPLE 17

Several samples of PTMSP containing various additives, along with a control sample, were cast in toluene (2 wt. % polymer) on a glass casting plate and air dried for 24 hours. The samples were then released from the glass plate via immersion in water and further dried under nitrogen for 24 hours (except for the aged sample which was maintained under nitrogen for 7 months). The mechanical properties of die cut specimens were testing using an Instron Tensile Testing Machine at 2"/min. The results are reported in Table 7 below.

TABLE 7

| Sample | Tensile Strength (psi) | Modulus At break (psi) | % Elongation At Break |
|---|---|---|---|
| PTMSP | | | |
| 1 day aging | 121,000 | 7,500 | 76 |
| 7 months aging | 121,000 | 7,600 | 84 |
| PTMSP with 10% PS-045 | 120,000 | 8,100 | 74 |
| PTMSP with 25% Nujol | 153,000 | 7,700 | 41 |
| PTMSP with 25% Drapex 68 | 150,000 | 9,000 | 70 |

From the results reported in Table 7 above, it can be seen that both aging and the addition of additives have limited effect on the mechanical properties of the films.

EXAMPLE 18

A polymer having the structural formula:

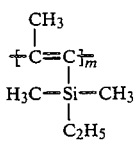

Wherein m is at least 100; was synthesized in accordance with the procedures for the synthesis of PTMSP and was cast from toluene. One sample contained 25 wt % Nujol oil as an additive. A control sample, along with the 25 wt. % Nujol sample was tested for $O_2$ and $N_2$ permeability and selectivity, and the results are reported in Table 8 below.

TABLE 8

| | $\overline{P}(O_2)$ | $\overline{P}(N_2)$ | $\alpha(O_2/N_2)$ |
|---|---|---|---|
| Control | 968 | 487 | 1.99 |
| 25% Nujol added. | 33 | 11 | 3.0 |

As can be seen from the results in Table 8, the presence of additives to polymers having the above structural formula significantly increases the selectivity for the separation of $N_2/O_2$.

Having thus described the present invention, what is now deemed appropriate for Letters Patent is set out in the following appended claims.

What is claimed is:

1. A polymeric membrane having improved selectivity for use in separating a feed gas mixture containing at least two gaseous components, said membrane comprising a polymer having the general structural formula:

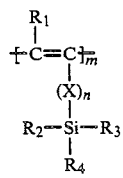

wherein $R_1$ is a linear or branched $C_1$-$C_4$ alkyl group; $R_2$ and $R_3$ are independently linear or branched $C_1$-$C_4$ alkyl groups; $R_4$ is a linear or branched $C_1$-$C_{12}$ alkyl group or aryl group; X is a $C_1$-$C_3$ alkyl group or phenyl; m is at least 100 and n is 0 or 1, to which has been added between about 5 and 50 wt. % of an additive which is miscible with said polymer, has a boiling point >300° C. at atmospheric pressure, is soluble in a common solvent for the polymer, and increases the selectivity ratio for $O_2/N_2$ by at least 15% over the polymer without said additive, and wherein said additive is selected from the group consisting of: silicon oils, non-ionic surfactants, hydrocarbon oils, flame retardant additives, epoxides, natural oils, liquid poly(vinyl chloride) stabilizers, aromatic compounds containing nitrogen groups, aromatic compounds containing sulfur groups, and mixtures thereof.

2. A polymeric membrane in accordance with claim 1 wherein the polymer is poly(trimethylsilypropyne) having the structural formula:

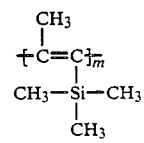

3. A polymeric membrane in accordance with claim 1 wherein the additive is a hydrocarbon oil chosen from the family of aliphatic, naphthenic, and aromatic petroleum process oils.

4. A polymeric membrane in accordance with claim 1 wherein the additive is a flame retardant additive chosen from phosphate esters, brominated aliphatic or brominated aromatic substances.

5. A polymeric membrane in accordance with claim 1 wherein the additive is an epoxide chosen from the family of cycloaliphatic epoxies, digylicdyl ethers, epoxidized soybean oil, epoxidized linseed oil, and epoxidized unsaturated hydrocarbon precursors.

6. A polymeric membrane in accordance with claim 1 wherein the additive is a natural oil chosen from the family of soybean oil, sunflower oil, palm oil, corn oil, linseed oil, and vegetable oil.

7. A polymeric membrane in accordance with claim 1 wherein the additive is of the family of liquid poly(vinyl chloride) stabilizers including barium-cadmium, barium-cadmium-zinc, octyl tin, and methyl tin.

8. A polymeric membrane in accordance with claim 1 where the silicone atom is replaced by germanium.

9. A polymeric membrane in accordance with claim 1 where the polymer is a copolymer comprised of different structural units of the general formula of claim 1.

10. A polymeric membrane in accordance with claim 1 wherein the polymer is a copolymer comprised of at least 50 wt. % of the structural units of the general formula of claim 1.

11. A polymeric membrane in accordance with claim 1 wherein the polymer is a block or graft copolymer comprised of at least 50 wt. % of the structural units of the general formula of claim 1.

12. A polymeric membrane in accordance with claim 1 wherein $R_1$=$CH_3$.

13. A polymeric membrane in accordance with claim 1 wherein $R_2$, $R_3$, and $R_4$ are independently $CH_3$.

14. A polymeric membrane in accordance with claim 1 wherein the membrane is utilized for separating $O_2/N_2$ mixtures.

15. A polymeric membrane in accordance with claim 1 wherein the membrane is utilized for separating gas mixtures selected from the group consisting of: $CO_2/CH_4$, $CO_2/N_2$, $He/N_2$, $H_2/N_2$, $He/CH_4$ and $H_2/CH_4$.

16. A process for separating components of a gas mixture containing at least two components, said process comprising bringing said gas mixture into contact with the polymeric membrane of claim 1 such that one component of said gas mixture permeates through the polymeric membrane at a faster rate than at least one other component to selectively separate the components of said gas mixture which are recovered as a permeate stream enriched in the more permeable component and as a reject stream enriched in the less permeable component.

17. A process in accordance with claim 16 wherein the polymer is poly (trimethylsilypropyne) having the structural formula:

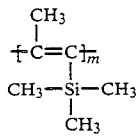

wherein m is at least 100.

18. A process in accordance with claim 16 wherein the silicone atom in the polymer is replaced by germanium.

19. A process in accordance with claim 16 wherein the gas mixture brought into contact with the polymeric membrane is selected from the group consisting of $O_2/N_2$, $CO_2/CH_4$, $CO_2/N_2$, $He/N_2$, $H_2/N_2$, $He/CH_4$ and $H_2/CH_4$.

* * * * *

UNITED STATES PATENT AND TRADEMARK OFFICE
CERTIFICATE OF CORRECTION

PATENT NO.   :   4,859,215

DATED        :   August 22, 1989

INVENTOR(S)  :   Michael Langsam, et al

It is certified that error appears in the above-identified patent and that said Letters Patent is hereby corrected as shown below:

Column 13, Line 62
  Delete "$C_4$" and substitute therefor  -- $C_6$

Signed and Sealed this

Sixth Day of August, 1991

Attest:

HARRY F. MANBECK, JR.

Attesting Officer

Commissioner of Patents and Trademarks